United States Patent

Brown

[15] 3,674,652

[45] *July 4, 1972

[54] METHOD OF WATER PURIFICATION

[72] Inventor: Melvin Henry Brown, Leechburg, Pa.

[73] Assignee: Aluminum Company of America, Pittsburgh, Pa.

[ * ] Notice: The portion of the term of this patent subsequent to Sept. 15, 1987, has been disclaimed.

[22] Filed: Aug. 14, 1969

[21] Appl. No.: 850,160

Related U.S. Application Data

[63] Continuation-in-part of Ser. No. 571,514, Aug. 10, 1966.

[52] U.S. Cl..............................203/11, 203/100, 202/205, 203/26
[51] Int. Cl..........................................................B01d 3/00
[58] Field of Search...........................203/10, 11, 4, 100, 26; 202/173, 174, 187, 189, 205, 201; 62/475; 55/46

[56] References Cited

UNITED STATES PATENTS

| 2,384,860 | 9/1945 | Thomas | 62/475 X |
| 2,759,882 | 8/1956 | Worthen | 203/24 |
| 3,394,055 | 7/1968 | Ludwig | 203/10 |
| 3,498,886 | 3/1970 | Walker | 203/11 X |
| 3,528,890 | 9/1970 | Brown | 203/4 |
| 3,396,086 | 8/1968 | Starmer | 203/26 |

Primary Examiner—Norman Yudkoff
Assistant Examiner—Hiram H. Bernstein
Attorney—Robert E. Isner and Carl R. Lippert

[57] ABSTRACT

Method of purifying water, such as sea water, by low temperature evaporation thereof under conditions of reduced pressure to produce a gaseous mixture of water vapor and non-condensible gas and, subsequent to substantial condensation of the water vapor, encapsulation of the remaining uncondensed water vapor and the non-condensible gases in a downwardly flowing vertical column of foamed encapsulating liquid.

5 Claims, 11 Drawing Figures

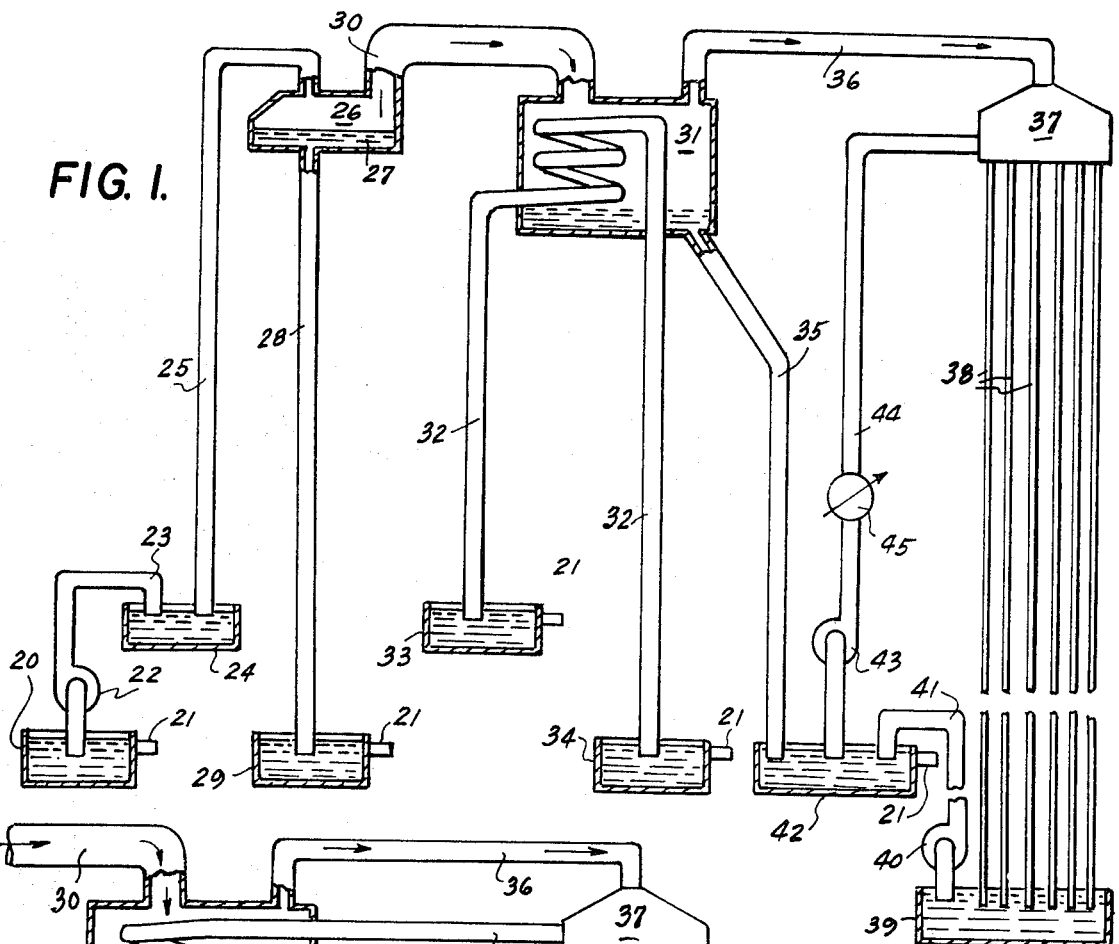
FIG. 1.
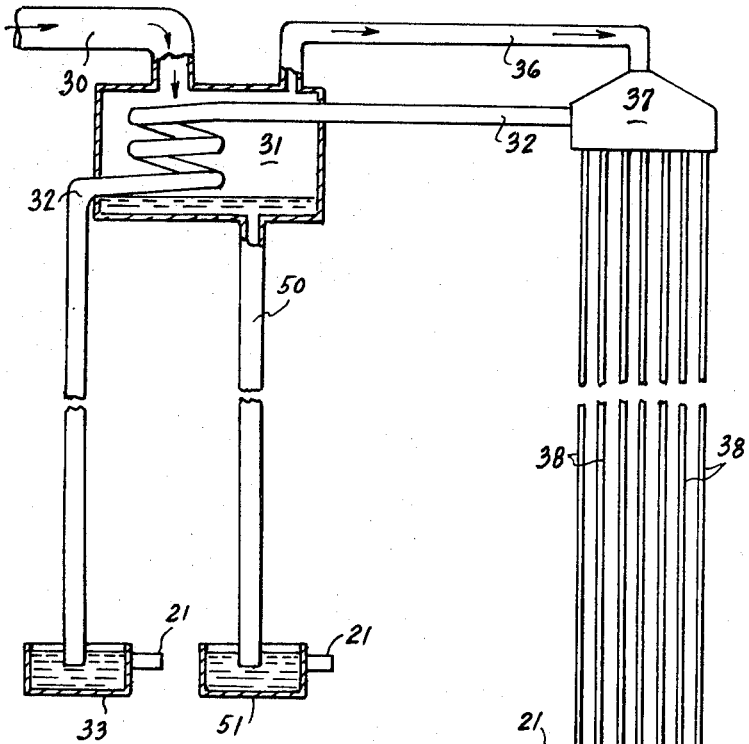
FIG. 2.
INVENTOR.
MELVIN H. BROWN
BY
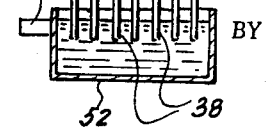
ATTORNEY

INVENTOR.
MELVIN H. BROWN
BY
ATTORNEY

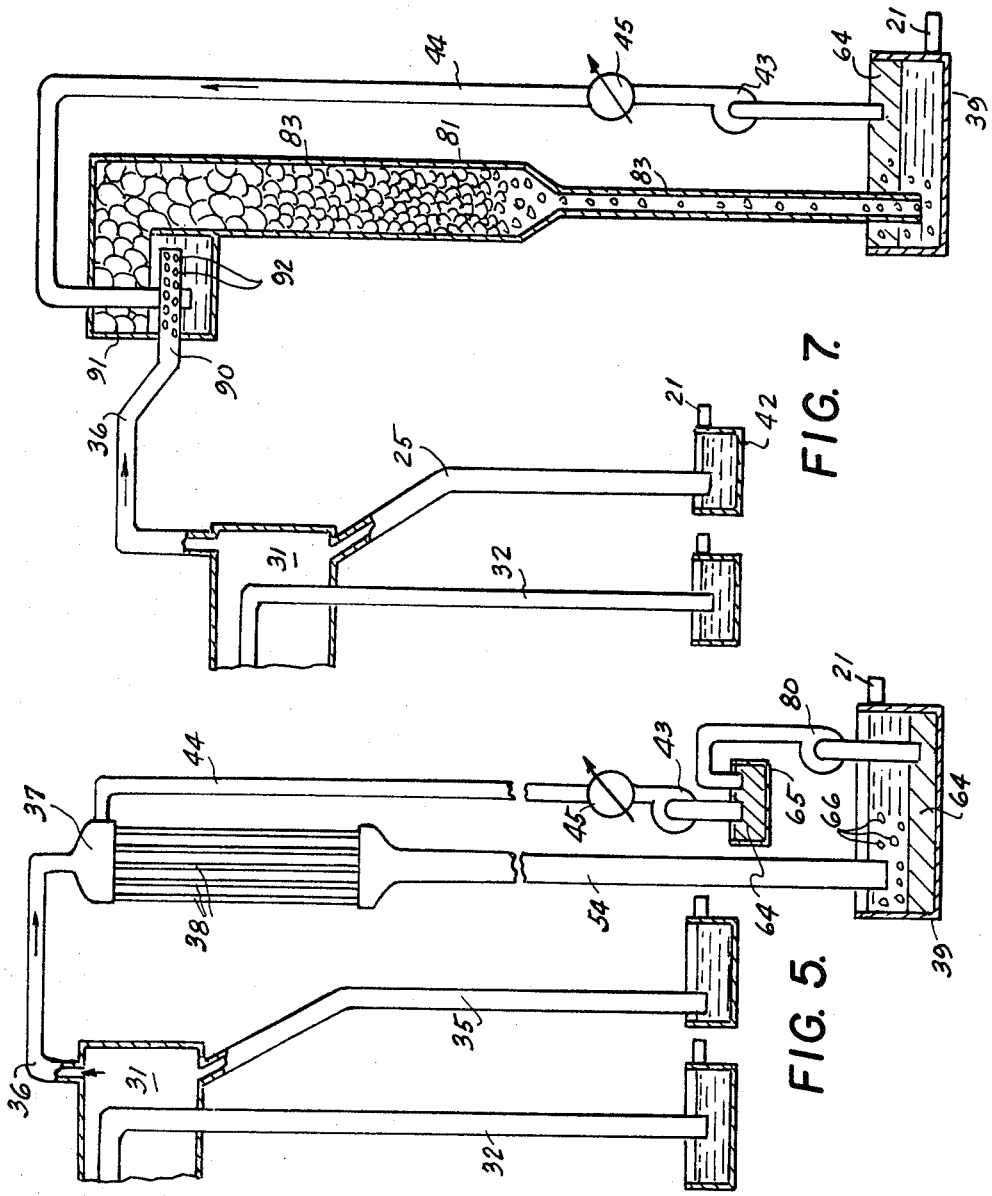

INVENTOR.
MELVIN H. BROWN
BY
ATTORNEY

INVENTOR.
MELVIN H. BROWN
BY

METHOD OF WATER PURIFICATION

This application is a continuation-in-part of my earlier application Ser. No. 571,514 filed Aug. 10, 1966.

This invention relates to purification methods by which a saline water, which also contains a non-condensible gaseous component, is treated to lower its chemical content to a level tolerable to the intended purpose which may be industrial in nature, the provision of water for irrigation, the provision of water for consumption by humans or animals, or other purpose. Sea water and brackish water are outstanding examples of saline waters which contain chemicals, contain non-condensible gas, and which usually require some purification. The general object of this invention is to purify such waters while overcoming difficulties inherent from the presence in the water of such non-condensible gaseous components as absorbed air, products of organic or inorganic reactions, or the like. Various approaches to the purification of such waters are known, including those which initially vaporize the water to effect the separation of water from chemical. The present invention offers advantages economically over many other processes particularly where purification of large volumes of water is effected through vaporization.

In the practice of the methods of this invention the saline water presented for treatment is evaporated at less then atmospheric pressure thereby producing, continuously over any given time period, a gaseous mixture containing water vapor as an essential component and non-condensible gas as an unavoidable component. As this gas mixture is produced it is subjected to a condensing step during which a recovery of a substantial portion of the water vapor content of the gaseous mixture is effected to obtain at least part of the purified product desired. As will appear, this condensing step may be the only step in which recovery of purified water is achieved; but usually I also prefer to effect further condensation during the gas removal step which follows the condensation step. In general, I prefer to condense prior to encapsulation of the gaseous mixture about 60 to about 95 percent or even greater by weight of the water vapor content of the gaseous mixture formed by the evaporation, since this will usually ensure optimum over-all economies in the operation of the method of the invention.

After this condensation is effected the remainder of the gas mixture is encapsulated, continuously over the period of its availability, in a liquid and at least in part by defining liquid film in the upper extremities of elongate, substantially vertical chambers to form encapsulated gas bodies some of which at the time of encapsulation may be substantially equal in horizontal cross sectional area and dimension to the horizontal cross section of the chamber in which the body is formed and in such manner that at least a multiplicity of said bodies are disposed in abutting interfacial engagement with the walls of each such chamber. After such formation in the upper extremity of a vertical chamber each body thus encapsulated is moved downwardly and compressed in the chamber by the formation above it of further such encapsulated bodies. As the result of this continuous encapsulation in liquid of bodies of the gas mixture and the compression and downward movement of the encapsulated bodies in the vertical chambers and their eventual release from the lower extremities thereof, the necessary maintenance of pressure in the system at the desired sub-atmospheric level is achieved.

The encapsulating liquid may vary in nature subject to the usual limitations as to toxicity, odor, and the like attendant upon the use to which any condensible portion of the gas mixture may be put and subject, further, to such viscosity requirements as will promote flow in the vertical chambers at the desired rate, all as hereinafter discussed.

The term "encapsulated" and its variants as used herein are used to convey the fact that bodies of the gas mixture are at least partially defined and surrounded by a liquid phase, at least a portion of which is in the form of a film. To avoid implications arising from specialized use of such terms in botanical, physiological and other arts, the terms are herein defined as used in the derivative sense of little chest or box. As will appear, the wall or media which defines the capsule of gas mixture is necessarily essentially liquid to provide flexibility under compression in the vertical chamber, but initially, at least, a portion of the capsule wall may be defined by the wall of the vertical chamber.

The invention is procedural in character and does not contemplate any particular apparatus within its scope. For purposes of illustration and description of the invention reference will be had to the accompanying drawings which schematically indicate general arrangements of parts and mechanisms grouped to apply the methods of the invention in various ways. In these drawings like numerals designate like parts.

This application is a continuation-in-part of my earlier application Ser. No. 571,514 filed Aug. 10, 1966.

FIG. 1 illustrates partly in elevation and partly in section one plan of operation of the invention wherein two separate condensing operations take place and in which the condensate is used as encapsulating liquid;

FIG. 2 illustrates partly in elevation and partly in section a plan of operation somewhat similar to that shown in FIG. 1 except that the product of the second condensation is sent to waste and an impure water, used as the coolant in the first condensation, is used as encapsulating liquid;

FIG. 5 illustrates, partly in section and partly in elevation, modification of the plan of operation illustrated in figures of lower number to the use of immiscible encapsulating liquid;

Figure 8:
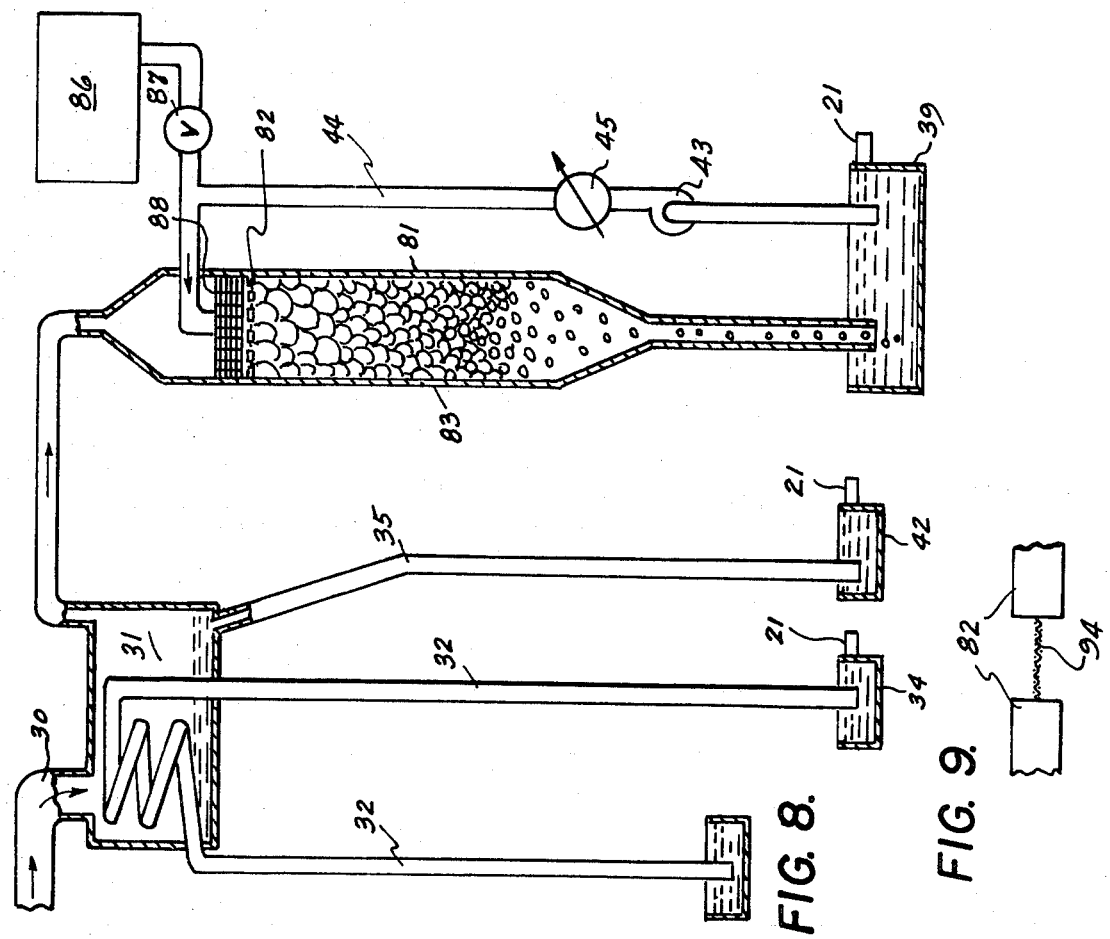
Figure 9:
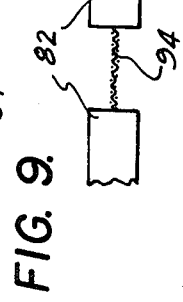
Figure 10:
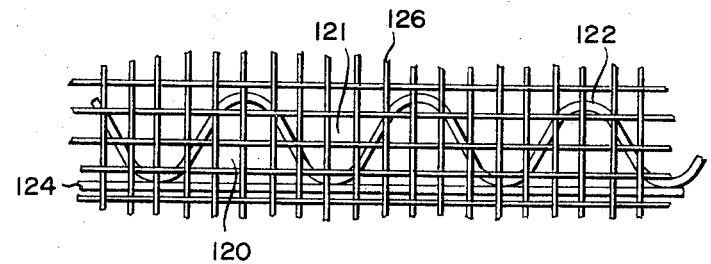
Figure 11:
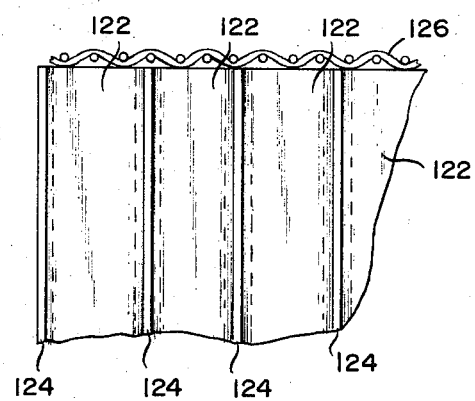

FIG. 7 illustrates, largely in section, another method of practicing the invention in which encapsulation of the gas mixture is by foaming the gas and compressing the foamed gas while condensing its condensible portion, the plan of operation shown being, otherwise, that shown in FIG. 5; and FIG. 8 is a view, largely in section, of a modification of the operational plan illustrated in FIG. 1, the encapsulating of the gas mixture being accomplished by foaming;

FIG. 9 is an enlarged view of a portion of FIG. 8;

FIG. 10 is an enlarged fragmentary plan view of an encapsulation chamber construction;

FIG. 11 is a fragmentary elevational view of the structure illustrated in FIG. 10.

Figure 6:
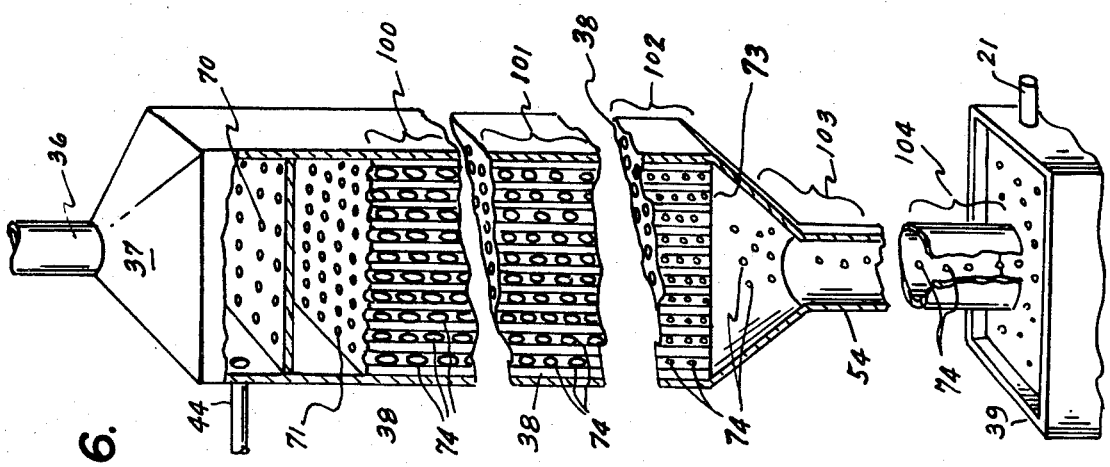
FIG. 6 illustrates the operation of encapsulating, compressing, and condensation steps used in the practice of the methods of water purification which embody the present inventions.

Referring to FIG. 1, the system shown involves evaporator 26, a first condenser 31, and a plurality of vertical chambers or column formers 38. The water to be purified is lifted from a source 20 by pump 22 through pipe 23 to tank 24 from whence it is lifted through leg 25 to the evaporator 26 where a portion is evaporated to form a gas mixture of water vapor and non-condensible gas which passes through passage 30 to condenser 31. The action in the vertical chambers 38 helps to furnish the vacuum which lifts the water through leg 25, lowers the pressure in the evaporator and induces the flow of the gas mixture formed on evaporation. Unevaporated water 27 collects in the bottom of evaporator 26 and from thence flows to waste through leg 28, basin 29 and its overflow pipe 21. Such heat as may be added to the water can conveniently be added at basin 24. Cool water flowing from source 33 through coil pipe 32 to outlet tank 34 causes condensing of part of the water vapor to obtain purified water which collects in the bottom of the condenser and passes therefrom through leg 35 into distillate basin 42 from whence it flows through an overflow 21 to the ultimate collection point. The uncondensed portion of the gas mixture flows through passage 36 to the distributing head 37 of a collection of a plurality of vertical chambers 38 which may be formed of tubes of any cross-sectional shape, but preferably round. The encapsulating liquid, in this case the distillate contained in distillate basin 42, is brought to the distributing head 37 through tube 44 and its heat exchanger 45 under the action of pump 43. In distributor head 37 the distillate flows from pipe 44 onto a perforate distribution plate 70, an example of which is shown in FIG. 6, and thence down upon the sheet 71 through which open the upper extremities of the vertical chambers 38. The gas mixture flowing into distribution head 37 and around distribution plate 70 enters the openings into the upper extremity of vertical chambers 38 and is there encapsulated, by the liquid flowing in said head, into somewhat elongate gas slugs the horizontal cross-section of which correspond in area and dimension to the horizontal cross-section of the chamber in which they are formed as, for example, in the general manner shown in U.S. Pat. No. 885,301 of 1908. After each gas body or slug is encapsulated it is forced downwardly by the weight of the succeeding encapsulated body in that chamber and is also by that weight compressed. Since displacement of the encapsulated body is imparted by the weight of encapsulating liquid disposed thereabove, the rate of displacement in the upper portions of the chamber will be necessarily slow. As encapsulation in a chamber progresses, the encapsulated body is further compressed while portions thereof which are condensible may also be condensed. Also, portions of the encapsulated body may be dissolved in the encapsulating liquid. Eventually, each encapsulated body of the gas mixture arrives in its downward movement at the exit of the chamber where the remaining gas leaves the chamber and exits through distillate tank 39 to the atmosphere. The encapsulating liquid, plus any distillate condensed from the gas mixture, flows into distillate tank 39 and from thence through pump 40 to tank 42. In the operation illustrated in FIG. 1 a transfer pipe 41 and pump 40 is provided to transfer from distillate tank 39 to tank 42. The removal of the gas mixture from the system through the elongate chambers 38 is continuous and positive and maintains a less than atmospheric pressure in the system at equilibrium conditions which are the function of the rate of evaporation, density and temperature of the encapsulating liquid, and the length and number of the vertical chambers 38. The plan of operation illustrated in FIG. 1 contemplates a recovery in two condensation steps, one at condenser 31 and one in vertical chambers 38. For the latter purpose the temperature of the encapsulating liquid and of the chambers 38 is maintained at a temperature below the condensing point of the condensible water vapor in the encapsulating gas mixture. In the specific system illustrated, proper temperature control can be accomplished by use of any liquid cooling means located at 45.

Where comparative purity factors will tolerate it, the system shown in FIG. 1 can be modified to the plan of operation shown in FIG. 2 wherein the coil pipe 32, used to bring coolant to the condenser 31, can be rearranged to feed encapsulating liquid to the header 37. The liquid flowing from the lower end of the vertical chambers 38 is received in a basin 52, maintained at chamber sealing level by overflow pipe 21, and the overflow sent to waste. Purified water is, therefore, only recovered at condenser 31 and flows through leg 50 to distillate basin 51 and through overflow pipe 21 to a proper collection point.

Figure 3:
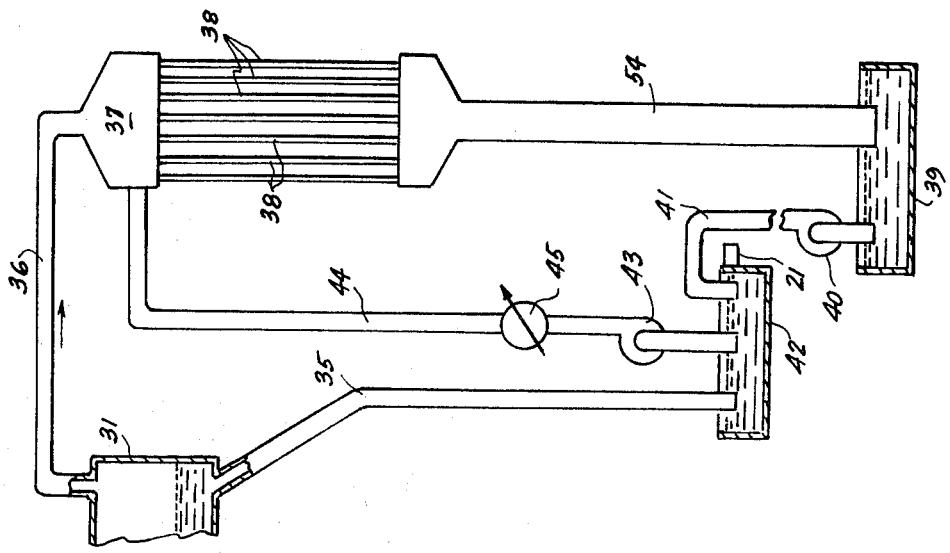
FIG. 3 illustrates a modification of FIG. 1 wherein the elongate chambers 38 are shortened and deliver into a confined vertical common stream.

In the plans of operation illustrated in FIGS. 1 and 2, a vertical chamber 38 having a circular cross-section of one-fourth inch diameter would for best results have a length of about 45 feet if water, whether pure or impure, is used as the encapsulating liquid. While there is nothing impractical in such a situation, a more preferred manner of handling the length of vertical chamber desired is illustrated in the modification of FIG. 3. In FIG. 3 the plan of operation shown is that of FIG. 1 previously described with the exception that the vertical chambers 38 are shortened to terminate in a single vertical chamber 54. Thus the effective height of the vertical chamber, considered in total, is not changed from whatever is chosen as the preferred height, but the multiplicity of chambers 38 is eliminated at a point after the cross-sectional dimensions of most of the encapsulated gas bodies has become less than that of the chambers 38. The situation just generally described is shown more specifically in FIG. 6. Referring to FIG. 6 in the initial reaches of chambers 38, as illustrated at area 100, the initially formed bodies of the gaseous misture may be somewhat elongate, as shown at 74, and may have, as previously stated, a horizontal cross-sectional area equal in area and dimension to the similar cross-section of the chamber 38. In any event, such bodies will be encapsulated, at least in part, by a defining liquid film and in such manner that at least a multiplicity of said bodies are disposed in abutting interfacial engagements with the walls of each such chamber. As the bodies 74 pass downwardly in the chambers 38 under the compression and downward gravitational force of similar bodies encapsulated in the chambers 38 at points above, the bodies tend to become smaller and circular in cross-section, as indicated at 74 at area 101 of said chambers 38. Finally, as compression of these bodies continues, the bodies largely diminish in horizontal cross-sectional area so that they become gas bubbles surrounded by a stream of encapsulating liquid, plus, of course, any liquid which may be the result of condensation of the condensible portions of the encapsulated gas mixture. The result becomes that illustrated at 74 in the area 102 indicated in FIG. 6. It is at about this point that we prefer to release the compressed bodies of gaseous mixture from at least some of the chambers 38 to a confined common stream defined by a single channel 54, thus creating the situation shown at areas 103 and 104 of FIG. 6. This common channel 54 into which the effluent of chambers 38 eventually merge represents a confined common stream which is maintained at a flow velocity sufficient to cause movement of the condensed encapsulated bodies 74 away from their point of delivery from chambers 38 to said common stream and, eventually, to the distillate reservoir 39 at which point the remaining bodies 74, now perhaps composed essentially of non-condensible gas, are released into the atmosphere through the seal formed by reservoir 39. Such flow velocity of the confined common stream sufficient to cause the movement of the condensed encapsulated bodies away from the chambers 38 is relatively high as compared to the velocity of the encapsulating liquid in the upper portions of the chambers 38.

Figure 4:
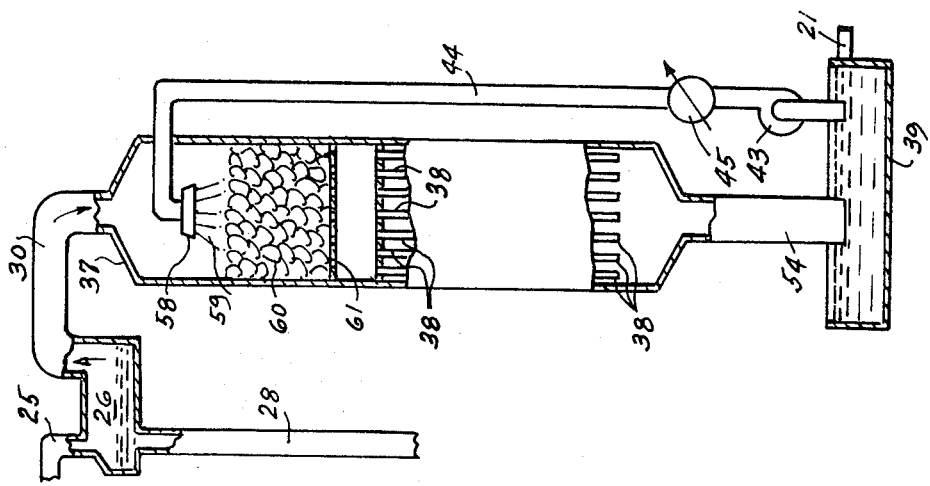
FIG. 4 illustrates, largely in section, another plan of operation of the invention.

In the unit shown in FIG. 4 the condensing action of vertical chambers 38 and the common stream 54 is augmented by providing in the header chamber 37 the packing 60 which is rested on the perforate plate 61, to provide additional surface area and impede rate of flow, and over which is sprayed, as from spray head 58, recycled distillate 59 from pipe 44. The effect is to preliminarily condense a part of the water component of the gas mixture from evaporator 26. The product of this condensation and the recycled distillate from spray 59 furnish the encapsulating liquid for the vertical chambers 38.

The cross-sectional shape of the vertical chambers in which encapsulating is initially accomplished may vary from a circle to a square, may be a quadrant or a half of a circle, or may be triangular or of other suitable shapes. The cross-sectional shape is not critical to the obtainment of the results hereinabove discussed. While the preferred cross-sectional shape of the chambers is circular, oblate, or approaching a circle, since such lend themselves to the ready formation of the encapsulated bodies of gas, economic considerations may dictate the use of other configurations, such as, for example, those illustrated in FIGS. 10 and 11. As there shown tube-like chambers 120 are defined by the interfacial disposition of a corrugated sheet 122 and flat sheet 124. These interfacially engaged corrugated and flat sheets are then wound in a spiral fashion to provide alternating flat and corrugated sheet layers wherein the crests of the corrugations in each sheet 122 abut the flat sheet 124 of the adjacent layer. Such construction facilitates the provision of a multiplicity of chambers having bell shaped cross-sections within a relatively small space and in an inexpensive manner. A wire mesh screen 126 is desirably positioned atop the chambers and the effective screen openings therein are advantageously sized to be smaller than the effective openings of the bell shaped chambers. The area of the cross-section of the vertical chambers has practical limits readily ascertained for any particular cross-sectional shape and any particular encapsulation liquid. Normally this area is relatively small, as for example and as pointed out earlier where water is used as the encapsulation liquid, a circular cross-section of ¼ inch diameter can be used. The cross-sectional area of these chambers 38 will, of course, effect efficient encapsulation because, in accordance with known laws, the viscosity of a given liquid is a limitation not only to its rate of flow but, also, to it ability to bridge a cross-sectional area. Generally, we prefer to select a vertical chamber or column former 38 which defines a column having a cross-sectional area which responds to a formula in which the length of the perimeter wetted by a liquid therein, expressed in inches, multiplied by the maximum distance, expressed in inches, between two points in the area produces a number less than 0.6. In our preferred practice, using water in the encapsulating liquid, we prefer dimensions which when multiplied as above produce a number of about 0.12.

The length of the column formed by a vertical chamber, and its attendant common stream chamber if one be used, will vary with the vacuum desired in the operation and the weight of the encapsulating liquid. For instance, where water is used as the encapsulating liquid, column lengths of up to 60 feet are desirable; but if mercury is used as the encapsulating liquid the same general results may be obtained by use of column lengths of 3 to 5 feet. Where mercury or other water-immiscible encapsulating liquids are used, the liquid is recirculated. Such a plan of operation is shown in FIG. 5, which illustrates a modification of the operations generally described with reference to FIGS. 1, 2 and 3. In this modification the source of the immiscible liquid 64, which is indicated in the drawings as heavier than water but may be the opposite, is the added reservoir 65 from which it is lifted to pump 43 through tube 44 to encapsulating position. When the encapsulated gas bodies, and the condensate of the water vapor, is delivered to basin 39 the immiscible liquid 64 separates in basin 39 from where it is transferred by means of pump 80 to the reservoir 65 for further use. Heat exchangers 45, or other cooling devices, are operated when desirable to maintain temperature within the vertical columns to effect the desired condensation of water vapor from the gas mixture.

In some instances it may be useful to encapsulate the gas bodies entirely in a liquid film, such as in a foam as indicated by way of example in FIGS. 7 and 8, each showing a plan of operation such as generally described with reference to FIG. 1.

The plans of operation indicated in FIGS. 7 and 8 differ from plans previously described herein only in that encapsulation of the gas mixture is by way of foaming. In FIG. 7, the encapsulating liquid is an immiscible foaming oil 64. While use of a multiplicity of elongate chambers of small cross-section is preferred, encapsulation in foam permits of the use of chambers of somewhat larger cross-section as illustrated by the single vertical column 81. As shown, the cross-sectional area of this column may be reduced in its lower reaches since the encapsulated gas mixture will become compressed at these lower points. In the operation illustrated in FIG. 7 the foaming oil 64 is delivered through pipe 44 by the action of pump 43 to oil bath 91. The gas mixture from condenser 31 flows through pipe 36 to the perforated end thereof 90 from which it is delivered, through perforations 92, to and through the oil bath to form foam 83 which fills column 81. This foam is composed of the gas mixture surrounded by the oil film and as further foam is formed the first-formed foam travels downwardly and is compressed in the column former 81. Simultaneously, the water vapor in the foamed gas mixture may be partially condensed. The compressed downwardly traveling foam exits from the lower end of column former 81 into the receiving, and column sealing, basin 39 where uncondensed water vapor and gaseous uncondensibles are released to atmosphere and the distillate is separated from the immiscible oil. In the operation illustrated in FIG. 8 water which contains a foaming agent, such as a foam-promoting detergent which produces a stable foam, is used as the encapsulating liquid and is recycled, additional foaming agent being added to the recycled water as dilution due to condensation may require. Referring to FIG. 8, water from reservoir 39 is raised by pump 43 through pipe 44 to the top of the vertical column 81 such cooling as may be required being furnished at heat exchanger 45. This water will, of course, contain some foaming agent which is supplemented, as desired, by valving detergent from supply tank 86 through valve 87 into the water. This recirculated water, containing adequate foaming agent, is released onto a bed of packing, or the like, such as the illustrated mat of screen 88 which rests on perforate plate 82 and there it encounters the gas mixture flowing from condenser 31 and encapsulates the gas in foam 83, which foam enters the column former 81 where it is compressed by the weight of the constantly added newly formed foam and eventually flows downwardly into the basin 39 where any uncondensed water vapor and the gaseous uncondensibles are released to the atmosphere. Preferably the perforations in plate 82 are bridged by a screen, such as a number 40 mesh wire screen, as illustrated at 94 in FIG. 9.

When water with a foaming agent additive is employed as the encapsulating liquid as noted above, the upper portion of each of the encapsulating chambers 38 will be filled with multiplicities of film encapsulated bodies of non-condensible gas and residual water vapor disposed in abutting interfacial relation with the walls of the chambers and with each other. The number and degree of such encapsulated bodies disposed in the upper portions of the chambers 38 will depend upon the dimensions of the encapsulated bodies and the cross-sectional dimensions of the chambers. For any given unit anywhere from one to a substantial number of liquid film bounded encapsulated bodies may be disposed at any given cross-section thereof.

The vertical chambers 38, as illustrated in the schematic drawings attached hereto, are conveniently shown as straight tubes. This is not a necessary condition. The chamber, or column former 38, must, to obtain compressive effect, have an over-all vertical component but this may be achieved in a helical, curved or serpentine column. The exact altitude or shape of these chambers or column formers is of no consequence so long as a component generally vertical to the earth exerts a downward compressive thrust by reason of the gravitational force of the capsuled gas mixture and its encapsulating liquid. The effective over-all length of the chambers, in the preferred aspects of the invention, is so selected with respect to the temperature and the velocity of flow of the liquid therein as to cause adjacent the lower extremity of said chambers a ratio of volume of encapsulated gas to volume of encapsulating liquid of not greater than 1.5 and, usually between about 0.05 and 1.5.

The receiving basins or delivery basins or reservoirs indicated at 29, 33, 34, 39, 42, 51 and 52 in the accompanying drawings are also sealing means for the legs or pipes extending into them, therefore to maintain, in the manner the liquid in the leg of a barometer is maintained, the liquid in said legs. The height of the legs will, of course, be adjusted in accordance with known principles to this end. The extent to which pumps are used to lift, or assist in the lift or transfer of liquid will, as usual in the art, be dictated by need and by the cost of pumping power at the site of the practice of the invention.

Having thus described my invention, I claim:

1. In a distillation type system for the production of discrete quantities of a utilizable fresh water product from an externally available source of saline water the steps of
    1. continuously evaporating a portion of a supply of saline water at less than atmospheric pressure to produce a gaseous mixture containing water vapor and non-condensible components,
    2. continuously replenishing said supply of saline water by introduction of fresh saline water from said externally available source thereof, 3. continuously removing unevaporated portions of said saline water from said supply,
4. initially condensing a substantial portion of said water vapor from said gaseous mixture to produce a discrete readily removable fresh water condensate,
5. continuously removing portions of said discrete fresh water condensate from the locus of condensation thereof to provide a discrete immediately utilizable product,
6. continuously encapsulating, essentially within a multi-element bubble-like foam constituted by a multiplicity of interengaged films of encapsulating liquid, bodies of the non-condensible components and the residual water vapor of said gaseous mixture in the upper portion of at least one elongate substantially vertical chamber in such manner that such foam encapsulated bodies during the early portion of their subsequent downward displacement are at least compositely substantially equal in area and dimension to the horizontal cross-section of said chamber,
7. selectively imparting downward displacement and concurrent compression of said encapsulated bodies within the upper portion of said chamber by the weight of the liquid defining subsequently encapsulated bodies disposed thereabove to provide an effluent deliverable from the lower portion thereof,
8. and maintaining the temperature of the encapsulating liquid below the condensation point of the water vapor contained within said encapsulated bodies to effect substantial condensation thereof during the downward displacement of said bodies.

2. In a distillation type system for the production of discrete quantities of a utilizable fresh water product from an externally available source of saline water the steps of
  1. continuously evaporating a portion of a supply of saline water at less than atmospheric pressure to produce a gaseous mixture containing water vapor and non-condensible components,
  2. continuously replenishing said supply of saline water by introduction of fresh saline water from said externally available source thereof,
  3. continuously removing unevaporated portions of said saline water from said supply,
  4. initially condensing a substantial portion of said water vapor from said gaseous mixture to produce a discrete readily removable fresh water condensate,
  5. continuously removing portions of said discrete fresh water condensate from the locus of condensation thereof to provide a discrete immediately utilizable product,
  6. continuously encapsulating, essentially within a multi-element bubble-like foam constituted by a multiplicity of interengaged films of encapsulating liquid bodies of non-condensible components and residual water vapor of said gaseous mixture in the upper portions of a multiplicity of elongate substantially vertical chambers in such manner that said foam encapsulated bodies, during the early portion of their subsequent downward displacement, are at least compositely substantially equal in area and dimension to the horizontal cross-section of said chambers, said chambers having a horizontal cross-sectional area of such character that the product of the length in inches of the wetted perimeter thereof and the maximum distance in inches between any two points thereon has a numerical value of less than 0.6,
  7. selectively imparting downward displacement and concurrent compression of said encapsulated bodies within the upper portions of said chambers by the weight of the liquid defining subsequently encapsulated bodies disposed thereabove to provide an effluent deliverable from the lower portions thereof, 8. releasing the effluent from said multiplicity of chambers into a confined common stream having a flow velocity that is relatively high compared to the rate of flow of liquid through said chambers and is of a magnitude to effect displacement of said effluent and any gas bodies contained therein away from said chambers and transfer thereof to a location external of the locus of evaporation,
  9. and maintaining the temperature of the encapsulating liquid below the condensation point of the water vapor contained within said encapsulated bodies to effect substantial condensation thereof during the downward displacement of said bodies.

3. The method according to claim 1 wherein the encapsulating liquid comprises water and a foaming agent and including the step of at least partially recycling the encapsulating liquid.

4. The method according to claim 1 wherein the encapsulating liquid comprises water and a foaming agent and including the steps of removing an amount of liquid corresponding to the condensation product in the effluent from said chambers, replenishing the remaining encapsulating liquid with foaming agent and returning the replenished encapsulating liquid to the upper extremity of said chamber to effect encapsulation of further of said bodies.

5. The method as set forth in claim 2 wherein said product has a value of about 0.12.

* * * * *